United States Patent
Kim et al.

(10) Patent No.: US 11,897,014 B2
(45) Date of Patent: Feb. 13, 2024

(54) HOT PRESS-FORMED PART, AND MANUFACTURING METHOD THEREOF

(71) Applicant: POSCO CO., LTD, Pohang-si (KR)

(72) Inventors: Seong-Woo Kim, Gwangyang-si (KR); Jin-Keun Oh, Gwangyang-si (KR); Sang-Heon Kim, Gwangyang-si (KR); Hyo-Sik Chun, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/096,260

(22) Filed: Jan. 12, 2023

(65) Prior Publication Data

US 2023/0167531 A1  Jun. 1, 2023

Related U.S. Application Data

(62) Division of application No. 17/296,458, filed as application No. PCT/KR2019/015951 on Nov. 20, 2019, now Pat. No. 11,578,397.

(30) Foreign Application Priority Data

Nov. 30, 2018  (KR) ........................ 10-2018-0153165

(51) Int. Cl.
B21D 35/00 (2006.01)
B32B 15/01 (2006.01)
(Continued)

(52) U.S. Cl.
CPC .......... B21D 35/007 (2013.01); B32B 15/012 (2013.01); C21D 6/002 (2013.01); (Continued)

(58) Field of Classification Search
None
See application file for complete search history.

(56) References Cited

U.S. PATENT DOCUMENTS 6,296,805 B1  10/2001  Laurent et al.
6,982,012 B2*  1/2006  Nomura ............... C21D 8/0226
148/601

(Continued)

FOREIGN PATENT DOCUMENTS

CN  102851629 A  1/2013
CN  108474096 A  8/2018
(Continued)

OTHER PUBLICATIONS

Extended European Search Report dated Jan. 5, 2022 issued in European Patent Application No. 19888634.3.
(Continued)

*Primary Examiner* — Daniel J. Schleis
(74) *Attorney, Agent, or Firm* — Morgan, Lewis & Bockius LLP

(57) ABSTRACT

The present disclosure provides a hot-press formed part comprising a plated steel sheet and an aluminum alloy plated layer formed on the plated steel sheet, wherein the aluminum alloy plated layer comprises: an alloying layer (I) formed on the plated steel sheet and containing, by weight %, 5-30% of Al; an alloying layer (II) formed on the alloying layer (I) and containing, by weight %, 30 to 60% of Al; an alloying layer (III) formed on the alloying layer (II) and containing, by weight %, 20-50% of Al and 5-20% of Si; and an alloying layer (IV) formed continuously or discontinuously on at least a part of the surface of the alloying layer (III), and containing 30-60% of Al, wherein the rate of the alloying layer (III) exposed on the outermost surface of the aluminum alloy plated layer is 10% or more.

2 Claims, 1 Drawing Sheet

(51) Int. Cl.
  *C21D 6/00* (2006.01)
  *C21D 9/46* (2006.01)
  *C22C 38/00* (2006.01)
  *C22C 38/02* (2006.01)
  *C22C 38/04* (2006.01)
  *C22C 38/06* (2006.01)
  *C22C 38/28* (2006.01)
  *C22C 38/32* (2006.01)
  *C23C 2/12* (2006.01)
  *C23C 2/28* (2006.01)
  *C23C 2/40* (2006.01)
  *C23C 2/26* (2006.01)

(52) U.S. Cl.
  CPC ............ *C21D 6/005* (2013.01); *C21D 6/008* (2013.01); *C21D 9/46* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C23C 2/12* (2013.01); *C23C 2/26* (2013.01); *C23C 2/28* (2013.01); *C23C 2/29* (2022.08); *C23C 2/40* (2013.01)

(56) References Cited

U.S. PATENT DOCUMENTS

| | | | |
|---|---|---|---|
| 10,590,522 | B2 | 3/2020 | Oh et al. |
| 11,338,549 | B2* | 5/2022 | Kim ................ C23C 28/322 |
| 2002/0018909 | A1 | 2/2002 | Mareuse et al. |
| 2004/0009366 | A1* | 1/2004 | Takagi ................ C23C 2/28 148/531 |
| 2016/0362764 | A1 | 12/2016 | Sohn et al. |
| 2016/0376679 | A1* | 12/2016 | Kim ................ C23C 2/02 428/653 |
| 2017/0029955 | A1 | 2/2017 | Kim et al. |
| 2019/0003029 | A1* | 1/2019 | Oh ................ C22C 38/04 |
| 2019/0366686 | A1 | 12/2019 | Fuda et al. |
| 2019/0390295 | A1 | 12/2019 | Nakagawa et al. |
| 2020/0017948 | A1 | 1/2020 | Van Schoonevelt et al. |
| 2020/0086608 | A1 | 3/2020 | Oh et al. |
| 2020/0109464 | A1 | 4/2020 | Kim et al. |
| 2020/0165712 | A1 | 5/2020 | Beentjes et al. |
| 2020/0190620 | A1 | 6/2020 | Kim et al. |
| 2020/0385836 | A1 | 12/2020 | Yi et al. |
| 2022/0049337 | A1 | 2/2022 | Kim et al. |

FOREIGN PATENT DOCUMENTS

| | | |
|---|---|---|
| CN | 108588612 A | 9/2018 |
| EP | 1380666 A1 | 1/2004 |
| EP | 3396010 A1 | 10/2018 |
| EP | 3889314 A1 | 10/2021 |
| JP | S51-030017 B1 | 8/1976 |
| JP | 2002-194519 A | 7/2002 |
| JP | 2004-176181 A | 6/2004 |
| JP | 2004-244704 A | 9/2004 |
| JP | 2005-264188 A | 9/2005 |
| JP | 2006-274300 A | 10/2006 |
| JP | 2010-018860 A | 1/2010 |
| JP | 2012-112010 A | 6/2012 |
| JP | 2017-532451 A | 11/2017 |
| JP | 2017-535666 A | 11/2017 |
| JP | 6428970 B1 | 11/2018 |
| JP | 2019-506523 A | 3/2019 |
| JP | 2020-509200 A | 3/2020 |
| JP | 2020-510755 A | 4/2020 |
| JP | 2020-510756 A | 4/2020 |
| JP | 2020-521880 A | 7/2020 |
| KR | 10-0723157 B1 | 5/2007 |
| KR | 10-1696121 B1 | 1/2017 |
| KR | 10-2018-0074292 A | 7/2018 |
| KR | 10-2018-0131943 A | 12/2018 |
| WO | 2010/005121 A1 | 1/2010 |
| WO | 2014/166630 A1 | 10/2014 |
| WO | 2016/104880 A1 | 6/2016 |
| WO | 2018/123831 A1 | 7/2018 |
| WO | 2018/142534 A1 | 8/2018 |
| WO | 2020/111879 A1 | 6/2020 |

OTHER PUBLICATIONS

Indian Office Action dated Mar. 2, 2022 issued in Indian Patent Application No. 2021170218762 (with English translation).
Chinese Office Action dated Oct. 27, 2022 issued in Chinese Patent Application No. 201980078903.2.
U.S. Notice of Allowance dated Oct. 13, 2022 issued in U.S. Appl. No. 17/296,458.
Japanese Office Action dated Jul. 26, 2022 issued in Japanese Patent Application No. 2021-530074.
U.S. Non-Final Office Action dated Jun. 22, 2022 issued in U.S. Appl. No. 17/296,458.
International Search Report and Written Opinion issued in corresponding International Application No. PCT/KR2019/015951 dated Mar. 3, 2020 (with partial English translation).

* cited by examiner

【Fig.1】
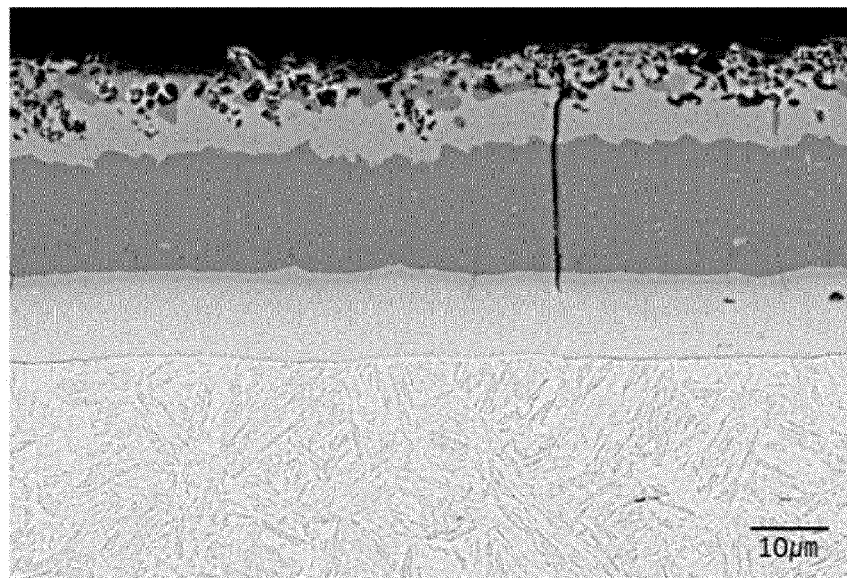
【Fig.2】
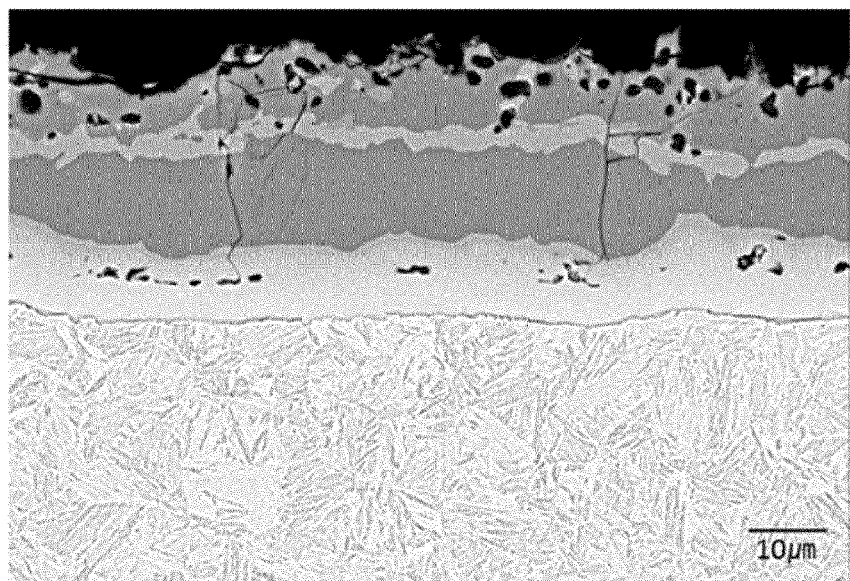

HOT PRESS-FORMED PART, AND MANUFACTURING METHOD THEREOF

CROSS REFERENCE

This application is a divisional patent application of U.S. patent application Ser. No. 17/296,458, filed on May 24, 2021, which is the U.S. National Phase under 35 U.S.C. § 371 of International Patent Application No. PCT/KR2019/015951, filed on Nov. 20, 2019, which claims the benefit of Korean Patent Application No. 10-2018-0153165, filed on Nov. 30, 2018, the entire contents of each are hereby incorporated by reference.

TECHNICAL FIELD

The present disclosure relates to a hot-press formed member and a method of manufacturing the same.

BACKGROUND ART

Recently, due to recent depletion of petroleum energy resources and high interest in the environment, regulations on improving fuel efficiency of automobiles have been strengthened. In terms of materials, one method to improve fuel efficiency of automobiles may be to reduce a thickness of a steel sheet used in automobiles. However, when a thickness is reduced, the safety of automobile may be affected. Thus, strength of a steel sheet may also need to improve.

For this reason, there has been continuous demand for a high-strength steel sheet, and various types of steel sheets have been developed. However, since such steel sheets have high strength, workability may be poor, which may be problematic. In other words, since a product of strength and elongation for each grade of a steel sheet may have a tendency to have a constant value, when strength of the steel sheet increases, elongation, an index of workability, may decrease, which may be problematic.

To solve this problem, a hot-press forming method has been suggested. The hot-press forming method is a method of increasing strength of a final product by processing a steel sheet at a high temperature suitable for processing the steel sheet, rapidly cooling the steel sheet to a low temperature, thereby forming a low-temperature structure such as martensite in the steel sheet. In this case, there may be an advantage in that the problem in workability when manufacturing a member having high strength may be reduced.

However, in the case of the hot-press forming method, since the steel sheet is heated to a high temperature, a surface of the steel sheet may be oxidized, and accordingly, a process of removing oxide on the surface of the steel sheet may need to be added after press forming, which may be problematic. As a method to solve this problem, the technique disclosed in U.S. Pat. No. 6,296,805 has been suggested. In the above U.S. Pat. No. 6,296,805, a steel sheet having gone through aluminum plating may be used for hot-press forming or room-temperature forming, and heating and rapid cooling ("heat treatment"). Since the aluminum plated layer is present on the surface of the steel sheet, the steel sheet may not be oxidized during heating.

However, in the case of hot-press forming a steel sheet having gone through aluminum plating, there may be a problem in that, although strength of a material is extremely low due to high temperature during hot forming, abrasion of a die may be severe, which may be a problem. That is because, base iron may diffuse into an aluminum plated layer while a plated steel sheet is heated for hot forming, and accordingly, a hard Fe and Al alloy layer may be formed on the surface of the steel sheet, and hardness of the alloy layer may be higher than hardness of a die material generally formed of tool steel, such that abrasion of the die may become severe by press forming. Accordingly, in the case of hot-press forming a steel sheet having gone through aluminum plating, a die may need to be ground or replaced in a short cycle, which may increase manufacturing costs of a hot-press formed member, which may be problematic.

DISCLOSURE

Technical Problem

The purpose of the present disclosure is to provide a hot-press formed member which may cause less abrasion of a hot-press forming die during hot-press forming, and a method of manufacturing the same.

The purpose of the present disclosure is not limited to the above description. A person skilled in the art to which the present disclosure belongs will not have any difficulty in understanding an additional purpose of the present disclosure from the general matters in the present specification.

Technical Solution

An aspect of the present disclosure relates to a hot-press formed member including a base steel sheet; and an aluminum alloy plated layer formed on the base steel sheet, wherein the aluminum alloy plated layer includes an alloying layer (I) formed on the base steel sheet and including, by weight %, 5-30% of Al; an alloying layer (II) formed on the alloying layer (I) and including, by weight %, 30 to 60% of Al; an alloying layer (III) formed on the alloying layer (II) and including, by weight %, 20-50% of Al and 5-20% of Si; and an alloying layer (IV) formed continuously or discontinuously on at least a portion of a surface of the alloying layer (III) and including 30-60% of Al, and wherein a rate of the alloying layer (III) exposed on an outermost surface of the aluminum alloy plated layer is 10% or more.

A plurality of pores may be formed in the alloying layer (III), and porosity of the alloying layer (III) may be 5-50%.

The base steel sheet may include, by weight %, 0.04-0.5% of C, 0.01-2% of Si, 0.1-5% of Mn, 0.001-0.05% of P, 0.0001-0.02% of S, 0.001-1% of Al, 0.001-0.02% of N, and a balance Fe and other impurities.

The base steel sheet may further include, by weight %, one or more of 0.001-0.01% of B, 0.01-1% of Cr, and 0.001-0.2% of Ti.

Another aspect of the present disclosure relates to a method of manufacturing a hot-press formed member, the method including aluminum-plating a surface of a base steel sheet and coiling the steel sheet, thereby obtaining an aluminum-plated steel sheet; annealing the aluminum-plated steel sheet, thereby obtaining an aluminum-iron alloy-plated steel sheet; and hot-press forming the aluminum-iron alloy plated steel sheet, wherein an aluminum plating amount is 30-200 g/m² based on a single side surface of the steel sheet, wherein a cooling rate to 250° C. is less than 20° C./sec after the aluminum plating, wherein coiling tension is 0.5-5 kg/mm² during the coiling, wherein the annealing is performed in a batch annealing furnace in a heating temperature range of 550-750° C. for 30 minutes-50 hours, wherein, when the heating is performed from room temperature to the heating temperature during the annealing, an average temperature increase rate is 10-100° C./h, and an average temperature increase rate in a 400-500° C. range is 1-15° C./h, wherein a difference between an atmosphere temperature in the batch annealing furnace and a temperature of the steel sheet is determined to be 5-80° C., and wherein a heat treatment is performed in a temperature range of Ac3-950° C. during the hot-press forming, the heating is performed at a temperature increase rate of 3-18° C./s to a temperature range from 200° C. to Ac3-950° C., and a heat treatment is performed for 1-15 minutes as a total heating time, and hot-press forming is performed.

An average abrasion depth of 10 points of a hot-press forming die may be 15 μm or less when the hot-press formed member is produced 500 times by the method of manufacturing the hot-press formed member.

Advantageous Effects

According to the present disclosure, when a hot-press formed member is manufactured, surface hardness of a plated layer may be lower than that of a hot-press forming die, such that abrasion of the die may reduce, thereby increasing grinding or replacement cycle of the hot-press forming die, and improving manufacturing costs and production efficiency of the hot-press formed member.

Various and beneficial advantages and effects of the present disclosure are not limited to the above description, and will be more easily understood in the course of describing specific embodiments of the present disclosure.

BRIEF DESCRIPTION OF DRAWINGS

FIG. 1 is an image of a cross-sectional surface of a plated layer of a hot-press formed member manufactured by inventive example 1, obtained using a scanning electron microscope; and FIG. 2 is an image of a cross-sectional surface of a plated layer of a hot-press formed member manufactured by comparative example 1, obtained using a scanning electron microscope.

BEST MODE FOR INVENTION

In the description below, a hot-press formed member will be described in detail according to an aspect of the present disclosure. In the present disclosure, it is noted that a content of each element may indicate by weight % unless otherwise indicated. Also, a ratio of crystals or structures may be based on an area unless otherwise indicated.

[Hot-Press Formed Member]

A hot-press formed member may include abase steel sheet, and an aluminum alloy plated layer formed on the base steel sheet, and the aluminum alloy plated layer may include an alloying layer (I) formed on the base steel sheet and including, by weight %, 5-30% of Al; an alloying layer (II) formed on the alloying layer (I) and including, by weight %, 30 to 60% of Al; an alloying layer (III) formed on the alloying layer (II) and including, by weight %, 20-50% of Al and 5-20% of Si; and an alloying layer (IV) formed continuously or discontinuously on at least a portion of a surface of the alloying layer (III) and including 30-60% of Al.

Preferably, each of the alloy layers may have component ranges as below. The alloying layer (I) may include, by weight %, 5-30% of Al, 0-10% of Si, and a balance of Fe and other inevitable impurities included by alloying, the alloying layer (II) may include, by weight %, 30-60% of Al, 0-5% of Si, and a balance of Fe and other inevitable impurities included by alloying, the alloying layer (III) may include, by weight %, 20-50% of Al, 5-20% of Si, and a balance of Fe and other inevitable impurities included by alloying, and the alloying layer (IV) may include, by weight %, 30-60% of Al, 0-5% of Si, and a balance of Fe and other inevitable impurities included by alloying.

When the base steel sheet is aluminum-plated and a heat treatment is performed thereon, Fe of the base steel sheet may be diffused to the aluminum plated layer having a high Al content. In the hot-press formed member in the present disclosure, alloying between Al and Fe may occur in the plated layer through an annealing treatment for alloying and a heat treatment during hot-press forming, and a layer structure consisting of the alloying layers (I)-(IV) may be formed depending on the degree of alloying of Fe.

The alloying layer (IV) may be formed continuously or discontinuously on at least a portion of the surface of the alloying layer (III). That is, the alloying layer (IV) may be formed on a portion of the surface of the alloying layer (III), rather than formed on the entire surface thereof.

Also, as the alloying layer (IV) is formed on at least a portion of the surface of the alloying layer (III), a portion of the surface of the alloying layer (III) may be exposed to an outermost surface of the aluminum alloy plated layer. Here, the outermost surface may refer to an outermost surface of the aluminum alloy plated layer on an opposite side of the base steel sheet. When an oxide layer is formed on the surface of the aluminum alloy plated layer, the outermost layer may refer to an uppermost surface of the layers other than the oxide layer.

In this case, a ratio of the alloying layer (III) exposed on the outermost surface of the aluminum alloy plated layer may be preferably 10% or more. Here, the ratio of the alloying layer (III) exposed on the outermost surface may be defined as the ratio of the length of an area in which the alloying layer (III) is exposed to a total length of the outermost surface when observing a cross-sectional surface of the alloy plated layer, or, in some cases, the ratio may be defined as an area ratio of the surface area of the alloying layer (III) exposed on the outermost surface to a surface area of the outermost surface of the aluminum alloy plated layer. Among the alloying layers, hardness of the alloying layer (II) and the alloying layer (IV) may be extremely high, about 900 Hv, while hardness of the alloying layer (I) and the alloying layer (III) may be about 300-700 Hv, relatively lower than those of the alloying layer (I) and the alloying layer (III). Therefore, when the exposed area of the alloying layer (III) having relatively low hardness increases on the outermost surface of the aluminum alloy plated layer in contact with the die during hot-press forming, overall average hardness of the outermost surface may decrease, such that abrasion of the die may decrease.

When the ratio of the alloying layer (III) exposed to the outermost surface is less than 10%, a difference between average hardness of the outermost surface and die hardness may decrease, such that die abrasion may not be effectively prevented. In terms of inhibiting die abrasion, the lower the hardness of the outermost surface of the aluminum alloy plated layer, the more preferable it may be, and thus, it may not be necessary to limit an upper limit of the ratio. Preferably, the ratio may be 15% or more, and in some cases, 20% or more.

A plurality of pores may be formed in the alloying layer III. When an aluminum alloy-plated steel sheet is manufactured by performing an alloying heat treatment on the aluminum-plated steel sheet in a batch annealing furnace under predetermined conditions, a plurality of alloy layers may be formed in the aluminum alloy-plated steel sheet, and a plurality of pores may be formed on an upper end alloy layer due to a difference in mutual diffusion coefficients such as Fe, Al, and Si between the alloy layers having different components. In this case, as an increasing number of pores are formed toward the upper end of the alloy layer, porosity may be high therein, and when the aluminum alloy plated steel sheet is heated and hot-press formed, an uppermost alloy layer having pores in high density may be broken to be small particles by press forming, and since rolling friction occurring when the small particles rolls may be smaller than sliding friction between the steel sheet and the die, lubricity between the die and the steel sheet may increase. The porosity may be defined as a ratio of the pore area to the area of each alloy layer (or the alloying layer) when the cross-sectional surface of the alloy layer (or the alloying layer) is observed.

However, as in FIG. 1, since most of the areas of the alloying layer IV are broken by the press forming during the hot-press forming, it may be difficult to measure porosity of the alloying layer IV in the hot-press formed member. Thus, the features of the present disclosure may be revealed through porosity of the alloying layer (III), which is less affected by press forming and has a close relationship with porosity of the alloying layer (IV) before press forming.

Accordingly, porosity of the alloying layer (III) of the hot-press formed member according to an aspect of the present disclosure may be 5-50%. When the porosity is less than 5%, it is difficult to expect a lubrication effect by a rolling friction effect during the hot-press forming. When the porosity exceeds 50%, the structure of the alloying layer (III) of the hot-press formed member may be excessively weakened, such that die contamination caused by particles fallen out of the plated layer in the die may increase during continuous hot-press forming. Therefore, in the present disclosure, the porosity may be preferably 5-50%, and in some cases, 7-50%.

The base steel sheet of the present disclosure may be a steel sheet for hot-press forming, and when the base steel sheet is used for hot-press forming, a composition thereof may not be particularly limited. However, according to an aspect of the present disclosure, the base steel sheet may include, by weight %, 0.04-0.5% of C, 0.01-2% of Si, 0.1-5% of Mn, 0.001-0.05% of P, 0.0001-0.02% of S, 0.001-1% of Al, 0.001-0.02% of N, and a balance Fe and other impurities. Each composition system will be described in greater detail.

C: 0.04-0.5%

C may be an essential element to increase strength of a heat treatment member, and may be added in an appropriate amount. That is, to secure sufficient strength of the heat treatment member, C may be added by 0.04% or more. Preferably, a lower limit of C content may be 0.1% or more. However, when the content is too high, when the cold rolled material is produced, strength of the hot rolled material may be too high when the hot rolled material is cold rolled, such that cold rolling properties may greatly degrade and spot weldability may greatly degrade. Thus, to secure sufficient cold rolling properties and weldability, C may be added in an amount of 0.5% or less. Also, the C content may be 0.45% or less, and more preferably, the content may be limited to 0.4% or less.

Si: 0.01-2%

Si may be added as a deoxidizer in steel making, and may also inhibit formation of carbides, which may have the greatest effect on strength of the hot-press-formed member. In the present disclosure, in the hot-press forming, to secure retained austenite by concentrating carbon on martensite lath grain boundaries after martensite is formed, the Si content may be 0.01% or more. Also, when aluminum plating is performed on the steel sheet after rolling, an upper limit of the Si content may be determined to be 2% to ensure sufficient plating properties. Preferably, the Si content may be limited to 1.5% or less.

Mn: 0.1-5%

Mn may be added in an amount of 0.1% or more to secure a solid solution strengthening effect and also to reduce a critical cooling rate for securing martensite in the hot-press-formed member. Also, as Mn may appropriately maintain strength of the steel sheet, Mn may secure hot-press forming process workability, may reduce manufacturing costs, and may improve spot weldability, and thus, the Mn content may be limited to 5% or less.

P: 0.001-0.05%

P may be present as one of impurities in steel, and it may be more advantageous when the content thereof is low. Therefore, in the present disclosure, the P content may be limited to 0.05% or less, and preferably, to 0.03% or less. As the smaller the amount of P, the more advantageous it may be as one of impurity elements, it may not be necessary to limit an upper limit thereof. However, to excessively lower the P content, manufacturing costs may increase, and thus, in consideration thereof, a lower limit thereof may be determined to be 0.001%.

S: 0.0001-0.02%

S may be one of impurities in steel, and may impair ductility, impact properties, and weldability of the member, and thus, a maximum content may be limited to 0.02%, and preferably to 0.01% or less. Also, when a minimum content is less than 0.0001%, manufacturing costs may increase, and thus, a lower limit of the content may be determined to be 0.0001%.

Al: 0.001-1%

Al may increase cleanliness of steel by deoxidizing in steelmaking together with Si, and may be added in an amount of 0.001% or more to obtain the above effect. Also, the content of Al may be limited to 1% or less to prevent an Ac3 temperature from excessively increasing such that heating required during the hot-press forming may be performed within an appropriate temperature range.

N: 0.001-0.02%

N may be included as one of impurities in steel, and to reduce sensitivity against cracking during slab continuous casting and to secure impact properties, a lower content thereof may be advantageous, and thus, N may be added by 0.02% or less. It may be necessary to determine a lower limit, but in consideration of an increase in manufacturing costs, the N content may be determined to be 0.001% or more.

In addition to the alloy composition described above, the aluminum-iron alloy plated steel sheet according to an aspect of the present disclosure may include one or more of 0.001-0.01% of B, 0.01-1% of Cr, and 0.001-0.2% of Ti.

B: 0.001-0.01%

B may improve hardenability even with a small amount, and may be segregated on a prior austenite grain boundary such that B may inhibit brittleness of the hot-press-formed member by grain boundary segregation of P and/or S. Therefore, 0.0001% or more of B may be added. When the content exceeds 0.01%, the effect may be saturated, and brittleness may be caused in hot rolling, and thus, an upper limit thereof may be determined to be 0.01%, and preferably, the B content may be determined to be 0.005% or less.

Cr: 0.01-1%

Cr may be added to obtain a solid solution strengthening effect and to improve hardenability during hot-press forming similarly to Mn, and 0.01% or more of Cr may be added to obtain the above effect. To secure weldability of the member, however, the content may be limited to 1% or less, and when the content exceeds 1%, the effect of improving hardenability may be insignificant as compared to the added amount, which may be disadvantageous in terms of costs.

Ti: 0.001-0.2%

Ti may be effective in improving strength of the heat treatment member by forming fine precipitates and improving collision performance of the member by refinement of grains, and also, when B is added, B may be preferentially reacted with N such that the effect of adding B may be maximized. To obtain the above effect, Ti may be added in an amount of 0.001% or more. However, the formation of coarse TiN caused by an increase in the Ti content may deteriorate the collision performance of the member, and thus, the content may be limited to 0.2% or less.

A remainder other than the above-described components may include iron (Fe) and inevitable impurities, and addition of any element may not be particularly limited as long as the element is able to be included in the steel sheet for the hot-press forming.

When the hot-press formed member having the above-described alloy composition and the layer structure is manufactured, a ratio of the alloying layer (III) having low hardness may increase on the surface of the aluminum alloy plated steel sheet during hot-press forming, such that average hardness of the surface may decrease, and thus, abrasion of the die caused by a difference in hardness may be effectively reduced. In particular, even when the hot-press formed member is produced more than 500 times, the 10-point average abrasion depth of the hot-press forming die may be 15 μm or less.

Also, a plurality of pores may be formed in the alloying layers (III) and (IV), upper end layers of the aluminum alloy plated layer, during the hot-press forming, and the alloying layer (IV) may be broken due to the pores during the press forming, such that a lubrication effect by rolling friction may be obtained, and damage to the die may further be prevented.

Hereinafter, a method of manufacturing a hot-press formed member according to another aspect of the present disclosure will be described in detail. The method of manufacturing a hot-press formed member described below may be merely an example, and it does not indicate that the hot-press formed member in the present disclosure needs to be manufactured by the manufacturing method. Any manufacturing method which may satisfy claims of the present disclosure may have no problem in implementing each embodiment of the present disclosure.

[Method of Manufacturing Hot-Press Formed Member]

The hot-press formed member in the present disclosure may be obtained by preparing a hot-rolled or cold-rolled base steel sheet, performing aluminum plating on a surface of the base steel sheet, performing an alloying heat treatment in a batch annealing furnace to obtain an aluminum alloy plated steel sheet, and performing hot-press forming under predetermined conditions.

First, a process of preparing the base steel sheet having the above-described alloy composition, plating aluminum on the surface of the base steel sheet under appropriate conditions, and coiling the steel sheet, thereby obtaining an aluminum plated steel sheet (coil) may be performed.

An aluminum plating treatment may be performed on the surface of the rolled steel sheet in a plating amount of 30-200 $g/m^2$ based on a single side. The aluminum plating may be AlSi plating (including 80% or more of Al and 5-20% of Si, and additional elements may be included if necessary), generally known as type I, and plating requiring 90% or more of Al and including additional elements if necessary, which may be known as type II, may also be used. To form a plated layer, hot-dip aluminum plating may be performed, and an annealing treatment may be performed on the steel sheet before plating. In the plating, a proper amount of plating may be 30-200 $g/m^2$ based on a single side. When the amount of plating is excessively high, it may take an excessive amount of time to alloy to the surface, and when the amount of plating is extremely low, it may be difficult to obtain sufficient corrosion resistance.

Thereafter, after the aluminum plating, cooling may be performed at a cooling rate of 20° C./sec or less to 250° C. The cooling rate after the aluminum plating may affect the formation of the diffusion inhibiting layer between the plated layer and the base iron. When the cooling rate after aluminum plating is extremely high, the diffusion inhibiting layer may not be uniformly formed, and alloying behavior of a coil during an annealing treatment subsequently performed may become uneven. Therefore, the cooling rate to 250° C. after the aluminum plating may be determined to be 20° C./sec or less.

When a coil is obtained by coiling the steel sheet after the plating, coiling tension of the coil may be adjusted to be 0.5-5 $kg/mm^2$. Depending on the adjustment of the coiling tension of the coil, alloying behavior and surface quality of the coil may differ during the annealing treatment subsequently performed.

Thereafter, the aluminum-plated steel sheet may be obtained by performing the annealing treatment under the conditions as below, thereby obtaining an aluminum-iron alloy plated steel sheet.

The aluminum-plated steel sheet (coil) may be heated in a batch annealing furnace (BAF). When the steel sheet is heated, as for the heat treatment target temperature and the maintaining time, the steel sheet may be maintained for 30 minutes-50 hours within a range of 550-750° C. (in the present disclosure, a highest temperature that the material reaches in this temperature range may be referred to as a heating temperature) based on the steel sheet temperature preferably. The maintaining time may be the time until the cooling is initiated after the coil temperature reaches the target temperature. When the alloying is not sufficiently performed, the plated layer may be peeled off during the roll leveling, and thus, the heating temperature may be determined to be 550° C. or higher for sufficient alloying. Also, to prevent excessive formation of oxides on the surface layer and to secure spot weldability, the heating temperature may be 750° C. or less. Also, to sufficiently secure the plated layer and to prevent degradation in productivity, the maintaining time may be determined to be 30 minutes-50 hours. In some cases, the temperature of the steel sheet may have a heating pattern in which the temperature may continue to rise without a cooling process until the heating temperature is reached, or a heating pattern in which the temperature equal to or lower than the target temperature may be maintained for predetermined time and may rise.

When the steel sheet is heated at the above-described heating temperature, to ensure sufficient productivity and to uniformly alloy the plated layer in the entire steel sheet (coil), an average temperature increase rate may be 10-100° C./h with reference to the steel sheet (coil) temperature for the entire temperature range (the range from room temperature to the heating temperature). The overall average temperature increase rate may be controlled within the above numerical range, but in an embodiment of the present disclosure, to prevent surface stains caused by a rolling oil remaining in the temperature range in which the rolling oil mixed into during rolling is vaporized and to secure sufficient productivity, the heating may be performed with an average temperature increase rate in the range of 400-500° C. to be 1-15° C./h when the temperature rises.

Also, a difference between an atmosphere temperature and the temperature of the steel sheet in the batch annealing furnace may be 5-80° C. Generally, the heating of the batch annealing furnace may be performed by a method of heating the steel sheet (coil) through an increase in the atmosphere temperature in the annealing furnace, rather than a method of directly heating the steel sheet (coil). In this case, the difference between the atmosphere temperature and the coil temperature may not be avoided, but to minimize a difference in materials and plating qualities for each position in the steel sheet, a difference between the atmosphere temperature and the steel sheet temperature may be be 80° C. or less based on the time point at which the heat treatment target temperature is reached. It may be ideal to reduce the temperature difference as much as possible, but the decreased temperature difference may decrease the temperature increase rate, such that it may be difficult to satisfy the entire average temperature increase rate condition, and thus, considering this, the difference may be determined to be 5° C. or more. The temperature of the steel sheet may refer to the temperature measured from a bottom portion (a lowest portion of the coil) of the charged steel sheet (coil), and the atmosphere temperature may refer to the temperature measured at a center of an internal space of the heating furnace.

After the aluminum alloy plated steel sheet is manufactured by the above-described manufacturing method, a hot-press forming may be performed on the aluminum alloy plated steel sheet, thereby manufacturing a hot-press formed member. In this case, as the hot-press forming, a method generally used in the technical field may be used, and as an example, although not limited thereto, a heat treatment may be performed in a temperature range of Ac3-950° C., heating may be performed at a temperature increase rate of 3-18° C./s from 200° C. to a temperature range of Ac3-950° C., a heat treatment may be performed for 1-15 minutes as a total heating time, and hot-press forming may be performed. The total heating time may be defined as the heating time including both the heating time in the temperature increase range and the heating time in the temperature range of Ac3-950° C.

BEST MODE FOR INVENTION

Hereinafter, the present disclosure will be described in greater detail through embodiments. However, it should be noted that the embodiment are merely to specify the present disclosure and not to limiting the scope of the present disclosure. The scope of the present disclosure may be determined by matters described in the claims and matters reasonably inferred therefrom.

(Embodiment)

First, a cold-rolled steel sheet for hot-press forming having the composition as in Table 1 was prepared as a base steel sheet, and the surface of the steel sheet was plated with a type I plating bath having an Al-9% Si-1.5% Fe composition. During the plating, the plating amount was adjusted to be 75 g/m² per a single side, and cooling was performed at a cooling rate of 10° C./sec to 250° C. after the aluminum plating, and coiling tension was adjusted to be 3 kg/mm², thereby obtaining an aluminum-plated steel sheet.

TABLE 1

| Element | C | Si | Mn | Al | P | S | N | Cr | Ti | B | Ac3 |
|---------|---|----|----|----|---|---|---|----|----|----|-----|
| Content (%) | 0.23 | 0.2 | 1.25 | 0.03 | 0.01 | 0.002 | 0.005 | 0.21 | 0.034 | 0.0022 | 822° C. |

Thereafter, an alloying heat treatment was performed on the plated steel sheet in a batch annealing furnace under the conditions as in Table 2 below, and hot-press forming was performed 500 times on each sample, thereby obtaining a hot-press formed member. However, in comparative example 1, the alloying heat treatment was not performed on the above-described aluminum-plated steel sheet, and hot-press forming was performed under the conditions as in Table 2, thereby obtaining a hot-press formed member.

TABLE 2

| | Alloying heat treatment conditions | | | | | Hot-press forming conditions | | |
|---|---|---|---|---|---|---|---|---|
| Classification | Temperature (° C.) | Average temperature increase rate (° C./h) | Average temperature increase rate in 400-500° C. temperature range (° C./h) | Temperature difference between atmosphere and steel sheet at heating temperature (° C.) | Time (h) | Temperature increase rate (° C./s) | Temperature (° C.) | Total heating time (min) |
| Inventive example 1 | 630 | 21 | 6 | 25 | 14 | 5.8 | 930 | 5 |
| Inventive example 2 | 590 | 25 | 10 | 30 | 30 | 8.5 | 900 | 6 |
| Inventive example 3 | 680 | 27 | 12 | 25 | 8 | 6.2 | 930 | 5 |

TABLE 2-continued

| | Alloying heat treatment conditions | | | | | Hot-press forming conditions | | |
|---|---|---|---|---|---|---|---|---|
| Classification | Average temperature (° C.) | Average temperature increase rate (° C./h) | Average temperature increase rate in 400-500° C. temperature range (° C./h) | Temperature difference between atmosphere and steel sheet at heating temperature (° C.) | Time (h) | Temperature increase rate (° C./s) | Temperature (° C.) | Total heating time (min) |
| Comparative example 1 | — | — | — | — | — | 3.4 | 930 | 5 |
| Comparative example 2 | 500 | 35 | 20 | 25 | 8 | 4.7 | 900 | 6 |

Thereafter, for the die used in each inventive example and comparative example, the member was produced 500 times, an abrasion depth was measured at random 10 points, and average values thereof are listed in Table 3 below. Among 500 products for each example, random ten samples were taken, cross-sectional surfaces thereof were observed using a scanning electron microscope to confirm occupancy of the outermost layer of the alloying layer (III), and average values of the occupancy are listed in Table 3 below. Also, porosity of the alloying layer (III) was measured, and results thereof are listed in Table 3 below. In the same embodiment (inventive example or comparative example), it has been indicated that a deviation between the occupancy in the outermost layer and porosity of the alloying layer (III) was not large.

TABLE 3

| Classification | Ratio of alloying layer (III) exposed on outermost surface (%) | Average die abrasion depth after 500 productions (μm) | Porosity of alloying layer (III) (%) |
|---|---|---|---|
| Inventive example 1 | 35 | 7 | 7.2 |
| Inventive example 2 | 12 | 9 | 5.7 |
| Inventive example 3 | 47 | 4 | 13.1 |
| Comparative example 1 | 7 | 39 | 1.7 |
| Comparative example 2 | 9 | 23 | 3.2 |

As indicated in Table 3, as for inventive examples 1 to 3 in which an area ratio of the alloying layer (III) exposed on the outermost surface was 10% or more, and the porosity is 5% or more, it has been confirmed that, even when the hot-press formed member was produced 500 times according to inventive examples 1 to 3, an average abrasion depth of the die was 15 μm or less, such that abrasion of the hot-press forming die was effectively inhibited. As for comparative example 1, a general Al—Si plated steel sheet was hot-press formed, and the area ratio of the alloying layer (III) exposed on the outermost surface was less than 10%, and the porosity was low, such that abrasion of the die greatly increased as compared to the invention example.

Also, as for comparative example 2, the alloying heat treatment of the aluminum plated layer was performed, but the alloying heat treatment temperature was low, such that the alloying was not sufficiently performed. Accordingly, it has confirmed that, as the area ratio of the alloying layer (III) exposed on the outermost surface was less than 10%, and the porosity was low, abrasion of the die significantly increased as in comparative example 1.

While the example embodiments have been illustrated and described above, it will be apparent to those skilled in the art that modifications and variations could be made without departing from the scope in the example embodiment as defined by the appended claims.

The invention claimed is:

1. A method of manufacturing a hot-press formed member, the method comprising:
   aluminum-plating a surface of a base steel sheet and coiling the steel sheet, thereby obtaining an aluminum-plated steel sheet;
   annealing the aluminum-plated steel sheet, thereby obtaining an aluminum-iron alloy-plated steel sheet; and
   hot-press forming the aluminum-iron alloy plated steel sheet,
   wherein an aluminum plating amount is 30-200 g/m² based on a single side surface of the steel sheet,
   wherein a cooling rate to 250° C. is less than 20° C./sec after the aluminum plating,
   wherein coiling tension is 0.5-5 kg/mm² during the coiling,
   wherein the annealing is performed in a batch annealing furnace in a heating temperature range of 550-750° C. for 30 minutes-50 hours,
   wherein, when the heating is performed from room temperature to the heating temperature during the annealing, an average temperature increase rate is 10-100° C./h, and an average temperature increase rate in a 400-500° C. range is 1-15° C./h,
   wherein a difference between an atmosphere temperature in the batch annealing furnace and a temperature of the steel sheet is determined to be 5-80° C., and
   wherein a heat treatment is performed in a temperature range of Ac3-950° C. during the hot-press forming, the heating is performed at a temperature increase rate of 3-18° C./s to a temperature range from 200° C. to Ac3-950° C., and a heat treatment is performed for 1-15 minutes as a total heating time, where the total heating time is defined as the heating time including both the heating time in the temperature increase range and the heating time in the temperature range of Ac3-950° C., and hot-press forming is performed.

2. The method of claim 1, wherein an average abrasion depth of 10 points of a hot-press forming die is 15 μm or less when the hot-press formed member is produced 500 times by the method of manufacturing the hot-press formed member as in claim 1.

* * * * *